United States Patent
Wang et al.

(10) Patent No.: US 10,166,988 B1
(45) Date of Patent: Jan. 1, 2019

(54) METHOD AND APPARATUS FOR CONTROLLING AN INTERNAL COMBUSTION ENGINE

(71) Applicant: GM GLOBAL TECHNOLOGY OPERATIONS LLC, Detroit, MI (US)

(72) Inventors: Yue-Yun Wang, Troy, MI (US); Alberto Lorenzo Vassallo, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/830,266

(22) Filed: Dec. 4, 2017

(51) Int. Cl.
*B60W 30/188* (2012.01)
*B60W 20/16* (2016.01)
*B60W 20/17* (2016.01)

(52) U.S. Cl.
CPC .......... *B60W 30/188* (2013.01); *B60W 20/16* (2016.01); *B60W 20/17* (2016.01); *B60W 2510/0657* (2013.01); *B60W 2510/083* (2013.01); *B60W 2710/0627* (2013.01)

(58) Field of Classification Search
CPC .... B60W 30/188; B60W 20/17; B60W 20/16; B60W 2510/0657; B60W 2510/083; B60W 2710/0627
USPC ....................................................... 701/101
See application file for complete search history.

(56) References Cited

U.S. PATENT DOCUMENTS

| 7,487,852 | B2 * | 2/2009 | Leone ................... | B60K 6/365 180/65.28 |
| 8,010,264 | B2 * | 8/2011 | Ogata ...................... | B60K 6/48 701/55 |
| 8,914,172 | B2 * | 12/2014 | Shiino ................... | B60W 20/15 701/22 |
| 9,518,530 | B2 * | 12/2016 | Thibault ................. | F02D 45/00 |
| 2007/0219045 | A1 * | 9/2007 | Ogata ...................... | B60K 6/48 477/3 |
| 2010/0286858 | A1 * | 11/2010 | Otokawa ................ | B60K 6/365 701/22 |
| 2011/0264353 | A1 * | 10/2011 | Atkinson ............ | F02D 41/1402 701/102 |

\* cited by examiner

*Primary Examiner* — Grant Moubry
(74) *Attorney, Agent, or Firm* — Quinn IP Law (57) ABSTRACT

A powertrain system including an internal combustion engine and an electric machine that are configured to generate torque that is transferred via a geartrain to a vehicle driveline is described. A method for controlling the powertrain system includes determining a desired output torque, and determining an engine torque command and an electric machine torque command based upon the desired output torque. An engine-out NOx setpoint associated with operating the engine at the desired output torque is determined. The electric machine is operated in response to the electric machine torque command. The engine is operated to generate torque in response to the engine torque command and engine operation is controlled to achieve the engine-out NOx setpoint.

18 Claims, 3 Drawing Sheets

METHOD AND APPARATUS FOR CONTROLLING AN INTERNAL COMBUSTION ENGINE

INTRODUCTION

Hybrid powertrain systems may include internal combustion engines and electric motor/generators that are coupled to gear trains to transfer torque to a driveline for tractive effort. Electric motor/generators can deliver or be supplied electric power from energy storage systems. Powertrain systems may operate in various modes to generate and transfer propulsion power to vehicle wheels.

SUMMARY

A powertrain system including an internal combustion engine and an electric machine that are configured to generate torque that is transferred via a geartrain to a vehicle driveline is described. A method for controlling the powertrain system includes determining a desired output torque, and determining an engine torque command and an electric machine torque command based upon the desired output torque. An engine-out NOx setpoint associated with operating the engine at the desired output torque is determined. The electric machine is operated in response to the electric machine torque command. The engine is operated to generate torque in response to the engine torque command and engine operation is controlled to achieve the engine-out NOx setpoint.

An aspect of the disclosure includes operating the engine to generate torque in response to the engine torque command, including supplying an amount of fuel to the internal combustion engine to generate torque in response to the engine torque command.

Another aspect of the disclosure includes controlling engine EGR flow to achieve the engine-out NOx setpoint.

Another aspect of the disclosure includes controlling engine start of injection timing to achieve the engine-out NOx setpoint.

Another aspect of the disclosure includes determining a magnitude of combustion noise associated with operating the engine at the desired output torque, and operating the engine to generate torque in response to the engine torque command and controlling engine operation to achieve a magnitude of combustion noise that is associated with operating the engine at the desired output torque.

Another aspect of the disclosure includes controlling engine start of injection timing to achieve the magnitude of combustion noise that is associated with operating at the desired output torque.

Another aspect of the disclosure includes dynamically determining engine-out NOx emissions, and executing a first closed-loop control routine to control the EGR flow based upon the engine out NOx emissions and the engine-out NOx setpoint.

Another aspect of the disclosure includes dynamically determining engine-out NOx emissions, and executing a second closed-loop control routine to control the SOI timing based upon the engine out NOx emissions and the engine-out NOx setpoint.

Another aspect of the disclosure includes determining a combustion noise setpoint associated with operating the engine at the desired output torque, operating the engine to generate torque in response to the engine torque command and controlling engine operation in response to the combustion noise setpoint.

Another aspect of the disclosure includes controlling SOI timing to achieve the combustion noise setpoint.

Another aspect of the disclosure includes controlling engine operation in response to the combustion noise setpoint, including dynamically determining combustion noise, and executing a third closed-loop control routine to control the SOI timing based upon the combustion noise and the combustion noise setpoint.

Another aspect of the disclosure includes dynamically determining combustion noise, and executing the third closed-loop control routine to control the EGR flow based upon the combustion noise and the combustion noise setpoint.

Another aspect of the disclosure includes the internal combustion engine being a compression-ignition engine.

Another aspect of the disclosure includes controlling a powertrain system including an internal combustion engine and an electric machine that are disposed to generate torque that is transferred via a geartrain to a vehicle driveline, including determining a magnitude of combustion noise associated with operating the engine at the desired output torque, and operating the engine to generate torque in response to the engine torque command and controlling engine operation to achieve a magnitude of combustion noise that is associated with operating the engine at the desired output torque.

Another aspect of the disclosure includes the engine being a compression-ignition engine, and controlling an engine start of injection timing to achieve the magnitude of combustion noise that is associated with operating at the desired output torque.

Another aspect of the disclosure includes the engine being a spark-ignition engine, and controlling an engine spark timing to achieve the magnitude of combustion noise that is associated with operating at the desired output torque.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
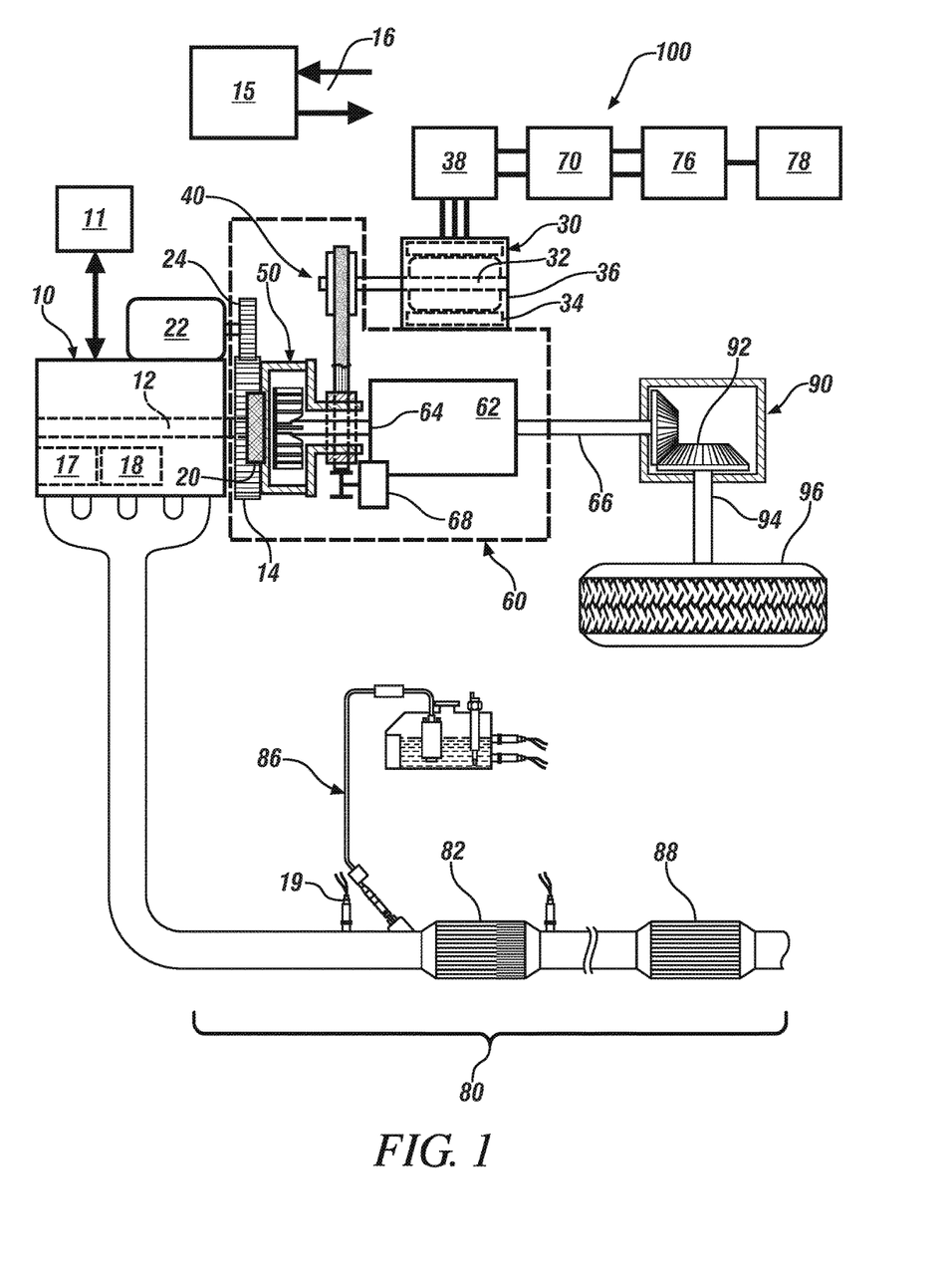
FIG. 1 schematically shows a hybrid drivetrain system for a vehicle, including an internal combustion engine and an electrically-powered torque machine that are mechanically coupled to a geartrain that is mechanically coupled to a driveline, in accordance with the disclosure.

Referring now to FIG. 1, a hybrid drivetrain 100 is schematically shown, and includes multiple torque-generating devices including an internal combustion engine (engine) 10 and at least one electrically-powered torque machine (electric machine) 30. The engine 10 and electric machine 30 are mechanically coupled to a geartrain 60, and the geartrain 60 is mechanically coupled to a driveline 90. The geartrain 60 includes a flywheel 14, a torque converter 50, an off-axis mechanical connection 40 and a transmission gearbox 62. The driveline 90 includes a differential gearset 92 that is coupled to at least one driveshaft member 94 that is coupled to a corresponding vehicle wheel 96. The electric machine 30 is mechanically coupled to the geartrain 60 via the off-axis mechanical connection 40. The concepts described herein may apply to any suitable configuration that includes an embodiment of the geartrain 60 that is disposed to transfer propulsion power between the internal combustion engine 10, the electric machine 30 and the driveline 90. Like numerals refer to like elements throughout the description. Operation of the hybrid drivetrain 100 may be controlled by a controller 15, which is shown as a unitary device for ease of illustration. The hybrid drivetrain 100 may be advantageously employed on a vehicle to provide propulsion power. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The engine 10 is configured as a multi-cylinder direct-injection compression-ignition internal combustion engine that converts fuel to mechanical torque through a thermodynamic combustion process in this embodiment. Alternatively, the engine 10 may be configured as a spark-ignition internal combustion engine. The engine 10 includes a crankshaft 12 that has an output portion that mechanically couples to a flywheel 14, which is coupled via a disconnect clutch 20 to a pump of the torque converter 50. The disconnect clutch 20 can facilitate powertrain operation in a plurality of modes described herein.

The engine 10 is equipped with a plurality of actuators and sensing devices for monitoring operation and delivering fuel to form in-cylinder combustion charges that generate an expansion force onto pistons, with such force transferred to the crankshaft 12 to produce torque. Actuators include direct injection fuel injectors 17 and an exhaust gas recirculation (EGR) valve 18. Sensors include an exhaust gas sensor 19, which can be disposed to monitor states of exhaust gas constituents in an exhaust gas feedstream of the engine 10. The exhaust gas sensor 19 is configured to monitor NOx emissions in one embodiment. The actuators of the engine 10, including the fuel injectors 17 and EGR valve 18 are controlled by an engine controller 11.

An exhaust aftertreatment system 80 is fluidly coupled to an exhaust manifold of the engine 10, and is configured to purify the exhaust gas feedstream output from the engine 10 during operation. The exhaust aftertreatment system include a lean NOx trap device (LNT), or alternatively, a selective catalytic reaction device (SCR) 82 that is fluidly coupled to a second aftertreatment device 88, e.g., an oxidation catalyst. When an SCR 82 is employed, a urea injection system 86 is disposed to inject urea into the exhaust gas feedstream upstream of the SCR 82.

In one embodiment, the engine 10 includes a starter 22 including a starter gear 24, wherein the starter gear 24 meshingly engages gear teeth that are disposed on an outer circumference of the flywheel 14 that is coupled to the crankshaft 12 in one embodiment. The off-axis mechanical connection 40 includes a first rotating member that rotatably couples to a second rotating member via a belt, a chain, meshed gears or another coupling arrangement, wherein the first rotating member is coupled to the electric machine 30 and the second rotating member is coupled to a pump portion of the torque converter 50. In one embodiment, the electric machine 30 is mechanically coupled to the geartrain 60 via the off-axis mechanical connection 40 in front of the disconnect clutch 20. Alternatively, the electric machine 30 is mechanically coupled to the geartrain 60 via the off-axis mechanical connection 40 after the disconnect clutch 20 and in front of the pump of the torque converter 50.

The electric machine 30 is a multi-phase electric motor/generator configured to convert stored electric energy to mechanical power and convert mechanical power to electric energy that may be stored in a DC power source 70. The DC power source 70 may be configured at a nominal 48 volt DC voltage level in one embodiment. Alternatively, the DC power source 70 may be configured at a nominal 300 volt DC voltage level, or another suitable voltage level, as may be selected. The electric machine 30 includes a rotor 32 and a stator 34 and an outer case 36, and electrically connects via an inverter module 38 to the DC power source 70. The rotor 32 couples to the first rotating member of the off-axis mechanical connection 40.

The transmission gearbox 62 may be arranged in a step-gear configuration in one embodiment, and may include one or more differential gearsets and activatable clutches configured to effect torque transfer in one of a plurality of fixed gear states over a range of speed ratios between the engine 10, the input member 64 and the output member 66. A hydraulic pump 68 is configured to supply pressurized hydraulic fluid to the transmission gearbox 62. Alternatively, the transmission gearbox 62 may be configured as a manual transmission, a continuously-variable transmission (CVT), a dual-clutch transmission (DCT), or another suitable arrangement.

The driveline 90 is disposed to transfer propulsion power between the transmission gearbox 62 and the vehicle wheel 96 via a driveshaft member 94, which is coupled to the differential gearset 92. The driveline 90 may be disposed in either a front-wheel drive configuration, a rear-wheel drive configuration (as shown) or an all-wheel drive configuration. The driveline 90 is configured to transfer tractive power between the output member 66 of the transmission gearbox 62, the electric machine 30 and a road surface via the wheel 96. The driveline 90 is illustrative, and the concepts described herein apply to other drivetrain systems that are similarly configured.

The inverter module 38 is configured with a controller and suitable control circuits including power transistors, e.g., integrated gate bipolar transistors (IGBTs) for transforming DC electric power to AC electric power and transforming AC electric power to DC electric power. The controller of the inverter module 38 receives motor control commands from the controller 15 and controls inverter states to provide a desired motor drive operation or a regenerative braking operation. In one embodiment, an auxiliary DC/DC electric power converter 76 electrically connects via a high-voltage bus to the DC power source 70, and provides electric power to charge the low-voltage battery 78 via a low-voltage bus. The low-voltage battery 78 provides low-voltage electric power to low-voltage systems on the hybrid drivetrain 100 and the vehicle, including, e.g., the starter 22, electric windows, HVAC fans, seats, and other devices. In one embodiment the low-voltage battery 78 is configured to operate at a nominal 12 volt DC voltage level.

The DC power source 70 is disposed to supply electric power at any suitable voltage level, and may be any DC power source, e.g., a multi-cell lithium ion device, an ultra-capacitor, or another suitable device without limitation. Monitored parameters related to the DC power source 70 include a state of charge (SOC), temperature, and others. In one embodiment, the DC power source 70 may electrically connect via an on-vehicle battery charger to a remote, off-vehicle electric power source for charging while the vehicle is stationary.

The controller 15 may signally connect to an operator interface (not shown), and operates to provide hierarchical control of a plurality of control devices to effect operational control of individual elements of the hybrid drivetrain 100 to generate propulsion power. Such control devices include, e.g., the inverter module 38, the engine controller 11 and the transmission controller. The controller 15 communicates with each of the inverter module 38, the engine controller 11 and the transmission controller, either directly or via a communications bus 16 to monitor operation and control operations thereof. The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event. Communication between controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

A parameter is defined as a measurable quantity that represents a physical property of a device or other element that is discernible using one or more sensors and/or a physical model. A parameter can have a discrete value, e.g., either "1" or "0", or can be infinitely variable in value.

Vehicle operation responsive to operator requests includes operating modes of acceleration, braking, steady-state running, coasting, and idling. The acceleration mode includes an operator request to increase vehicle speed. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold speed and the operator request is at a point that is less than is required to maintain the present vehicle speed. The idle mode includes vehicle operation wherein vehicle speed is at or near zero.

The hybrid drivetrain 100 is operative in one of a plurality of modes, which may be selected and implemented during ongoing drivetrain operation to effect vehicle operations of acceleration, braking, steady-state running, coasting, and idling. The drivetrain modes include the engine-only drive mode, an electric-only drive mode, a regenerative mode, and an engine/electric-assist drive mode, with accompanying engine autostart/autostop operations. In the engine-only drive mode, the engine 10 is controlled to generate propulsion power while the electric machine 30 freewheels. This mode may be commanded during vehicle acceleration or steady-state operation, or when SOC of the DC power source 70 is greater than a maximum level, or less than a minimum level. In the electric-only drive mode, the electric machine 30 is controlled as a motor to generate propulsion power, while the engine 10 is in the OFF state and disconnected by action of the disconnect clutch 20. This mode may be commanded during idle, vehicle acceleration or steady-state running. In the regenerative mode, the electric machine 30 is controlled as a generator to react driveline torque and generate electric power, while the engine 10 either at idle or is in the OFF state and disconnected by action of the disconnect clutch 20. This mode may be commanded during coasting and vehicle braking. In the engine/electric-assist drive mode, the engine 10 and the electric machine 30 are controlled to generate propulsion power. This mode may be commanded during vehicle acceleration or steady-state running.

Figure 2:
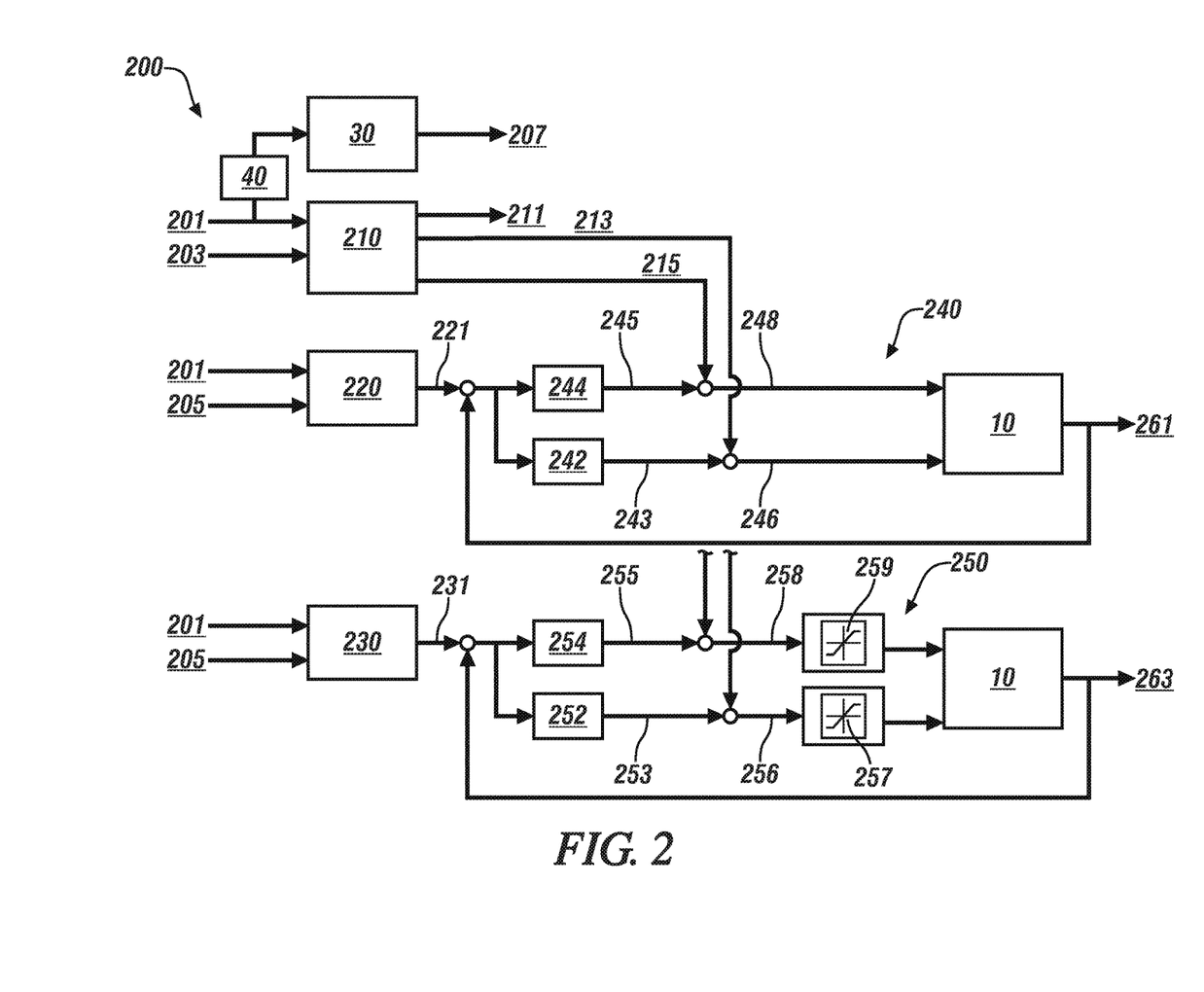
FIG. 2 schematically shows a first control routine for controlling operation of an embodiment of the hybrid drivetrain system described with reference to FIG. 1 that includes a compression-ignition internal combustion engine, wherein the hybrid drivetrain system is operating in an engine/electric-assist drive mode to generate propulsion power, in accordance with the disclosure.

FIG. 2 schematically shows a control routine 200 that can be advantageously executed to control operation of the hybrid drivetrain 100 when operating in the engine/electric-assist drive mode wherein the engine 10 and the electric machine 30 are controlled to generate propulsion power in response to a desired output torque 205 that is input by the vehicle operator in one embodiment.

The inputs to the control routine 200 include the desired output torque 205, the engine speed (RPM) 201 and desired engine torque 203, and a desired motor torque 207. The desired motor torque 207 is generated by the electric machine 30, taking into consideration the mechanical coupling arrangement between the engine 10, the electric machine 30 and the geartrain 60. The control routine 200 can be executed in the engine controller 11. The desired output torque 205 is achieved by the desired engine torque 203 in combination with the desired motor torque 207.

The engine speed 201 and desired engine torque 203 are employed by a first engine control routine 210, which determines engine operating commands including a fuel command 211, an initial EGR rate command 213 and an initial start-of-fuel-injection timing (SOI) command 215.

The engine speed 201 and the desired output torque 205 are employed by a second engine control routine 220, which determines an engine-out NOx setpoint 221. The engine-out NOx setpoint 221 represents the amount of engine-out NOx that is generated by operating the engine 10 at the desired output torque 205 and engine speed 201 without supplemental torque being provided by the electric machine 30. Such determination can be made employing a model of the engine 10 that can be developed off-line to provide an estimated value for engine-out NOx that is generated based upon engine speed and load conditions. The estimated value for the engine-out NOx setpoint 221 may be derived and/or verified experimentally.

The engine-out NOx setpoint 221 is provided as input to a first closed-loop routine 240 associated with operation of the engine 10, which includes a first PID (Proportional-Integral-Derivative) controller 242 for controlling an EGR flowrate based upon a difference between the measured engine-out NOx emissions 261 and the engine-out NOx setpoint 221, wherein the measured engine-out NOx emissions 261 is directly measured or otherwise indicated by the engine-out NOx sensor 19. Controlling the EGR flowrate includes controlling the EGR valve 18 to achieve a magnitude of flow of recirculated exhaust gas that results in having a portion of a cylinder charge that achieves a desired combustion temperature, wherein the desired combustion temperature is selected based at least in part upon NOx generation in the combustion chamber. The first PID controller 242 determines a first EGR rate correction term 243, which is combined with the initial EGR rate command 213 to determine a final EGR rate command 246, which is employed to control operation of the EGR valve in the engine 10.

The first closed-loop routine 240 further includes a second PID controller 244 for controlling SOI based upon the difference between the measured engine-out NOx emissions 261 and the engine-out NOx setpoint 221. The second PID controller 244 determines a first SOI correction term 245, which is combined with the initial SOI command 215 to determine a final SOI command 248, which is employed to control operation of the fuel injection system to control timing of fuel injection relative to cylinder top-dead-center positions in the engine 10.

PID controllers are devices, in the form of electronic controllers, e.g., ASICs, electronic circuits, and/or central processing unit(s), and associated memory and information storage devices that determine an actuator command based upon a desired state for a parameter and a measured state for the parameter that may be determined by input from a sensor, employing Proportional, Integral and Derivative (PID) responses.

The engine speed 201 and the desired output torque 205 are employed by a third engine control routine 230, which determines a combustion noise setpoint 231. The combustion noise setpoint 231 represents the amount of combustion noise that is generated by operating the engine 10 at the desired output torque 205 and engine speed 201 without supplemental torque being provided by the electric machine 30. Such determination can be made employing a model of the engine 10 that can be developed off-line to provide an estimated value for combustion noise that is generated based upon engine speed and load conditions.

The combustion noise setpoint 231 is provided as input to a second closed-loop routine 250 associated with operation of the engine 10, which includes a third PID controller 252 for controlling combustion noise based upon a difference between combustion noise 263 for the engine 10 and the combustion noise setpoint 231, wherein the combustion noise 263 is estimated, measured or otherwise indicated by operation of the engine 10. The third PID controller 252 determines a first combustion noise-based EGR correction term 253, which is combined with the initial EGR rate command 213 to determine a final EGR rate command 256, which is subjected to a filter 257 and employed to control operation of the EGR valve 18 in the engine 10.

The second closed-loop routine 250 further includes a fourth PID controller 254 for controlling SOI based upon the difference between the combustion noise 263 and the combustion noise setpoint 231. The fourth PID controller 254 determines a noise-based SOI correction term 255, which is combined with the initial SOI command 215 to determine a final SOI command 258, which is subjected to a filter 259 and employed to control operation of the fuel injection system to control timing of fuel injection relative to cylinder top-dead-center positions in the engine 10.

The concepts described herein permit engine control that operates with engine-out NOx and combustion noise being controlled at baseline levels, or to an intermediate level through control of SOI and EGR, with more advanced SOI timing and less EGR than that at the present engine speed and desired engine torque operating conditions. This may enable additional CO2 reduction and provide transparent operation independently from operation of the electric machine 30.

Figure 3:
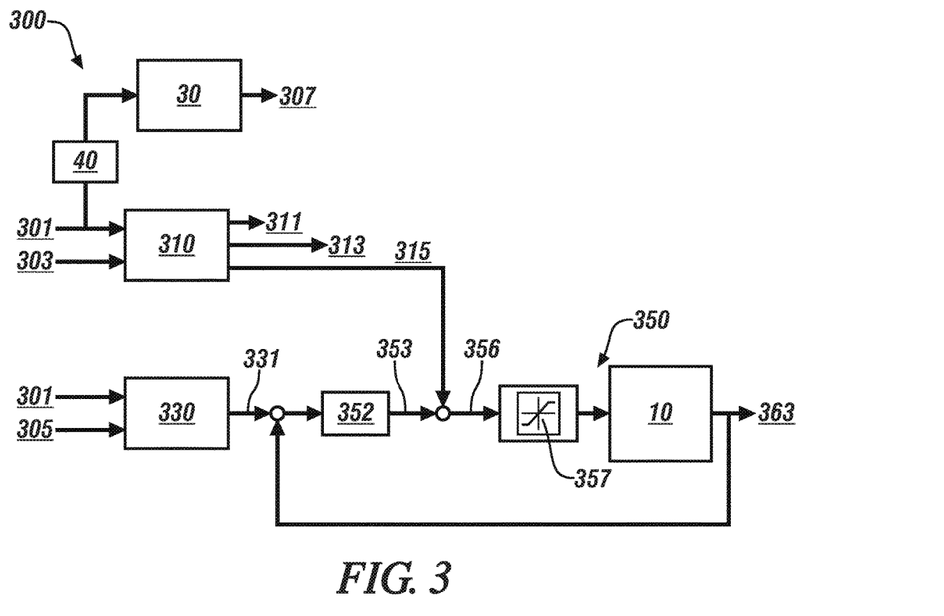
FIG. 3 schematically shows a second control routine for controlling operation of an embodiment of the hybrid drivetrain system described with reference to FIG. 1 that includes a spark-ignition internal combustion engine, wherein the hybrid drivetrain system is operating in an engine/electric-assist drive mode to generate propulsion power, in accordance with the disclosure.

FIG. 3 schematically shows a control routine 300 that can be advantageously executed to control operation of the hybrid drivetrain 100 when operating in the engine/electric-assist drive mode wherein the engine 10 and the electric machine 30 are controlled to generate propulsion power in response to a desired output torque 305 that is input by the vehicle operator in one embodiment. In this embodiment, the engine 10 is configured as a spark-ignition engine.

The inputs to the control routine 300 include the desired output torque 305, the engine speed (RPM) 301 and desired engine torque 303, and a desired motor torque 307. The desired motor torque 307 is generated by the electric machine 30, taking into consideration the mechanical coupling arrangement between the engine 10, the electric machine 30 and the geartrain 60. The control routine 300 can be executed in the engine controller 11.

The engine speed 301 and desired engine torque 303 are employed by a fourth engine control routine 310, which determines engine operating commands including a fuel command 311, an initial EGR rate command 313 and an spark timing (SPK) command 315 based thereon.

The engine speed 301 and the desired output torque 305 are employed by a fifth engine control routine 330, which determines a combustion noise setpoint 331. The combustion noise setpoint 331 represents the amount of combustion noise that is generated by operating the engine 10 at the desired output torque 305 and engine speed 301 without supplemental torque being provided by the electric machine 30. Such determination can be made employing a model of the engine 10 that can be developed off-line to provide an estimated value for combustion noise that is generated based upon engine speed and load conditions.

The combustion noise setpoint 331 is provided as input to a third closed-loop routine 350 associated with operation of the engine 10, which includes a PID controller 352 for controlling combustion noise based upon a difference between combustion noise 363 for the engine 10 and the combustion noise setpoint 331, wherein the combustion noise 363 is estimated, measured or otherwise indicated by operation of the engine 10. The PID controller 352 determines a first combustion noise-based SPK correction term 353, which is combined with the initial SPK command 315 to determine a final SPK command 356, which is subjected to a filter 357 and employed to control spark timing in the engine 10.

Figure 4:
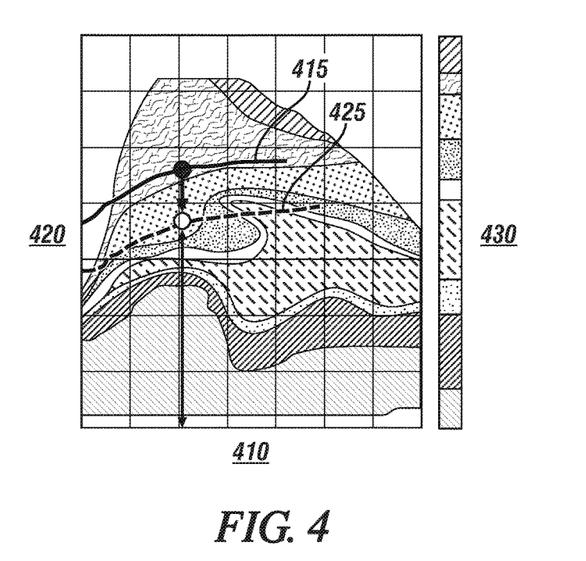
FIG. 4 graphically shows results related to operation of an embodiment of the internal combustion engine described with reference to FIG. 1, including a range of engine speed (RPM) states, engine torque states, and resulting NOx emissions output in accordance with the disclosure.

FIG. 4 graphically shows results related to operation of an embodiment of the internal combustion engine 10 described with reference to FIG. 1, including a range of engine speed (RPM) states indicated on the horizontal axis 410, engine torque states indicated on the left vertical axis 420, and resulting NOx emissions output on the right vertical axis 430. The line indicated by numeral 415 shows a total torque output and corresponding NOx emissions with the engine 10 operating at peak efficiency and with no torque contribution from the electric machine 30 to generate a desired output torque. The line indicated by numeral 425 shows a total engine torque output and corresponding NOx emissions with the engine 10 operating at a reduced torque output, wherein the electric machine 30 is generating supplemental torque to achieve the desired output torque.

When a vehicle maneuver requires a desired total torque output along the curve 415, the control routine 200 in FIG. 2 will set the desired output torque 205 to be equal to the desired total torque output, and the desired total torque is split into the a desired engine torque 203 and a desired motor torque 207 based on the availability of battery energy or the SOC level of the DC power source 70. Since the motor now provides partial propulsion torque, the engine load is downshifted or the engine is only required to provide the reduced torque output along the actual torque curve 425 to save fuel. At the reduced engine torque output, the engine operation results in reduced combustion noises and reduced engine NOx emissions. However, at this engine speed, the engine aftertreatment system is capable of reducing more NOx emissions generated at the baseline operating curve 415 without the supplement electrical motor torque. The control routine 220 increases the engine NOx emission target level to the baseline NOx level that is defined or estimated at the operating curve 415, and the control routine 230 increases the engine combustion noise level to the baseline noise level at the operating curve 415. Thus, although the engine 10 operates in speed and torque curve along the line 425, through the closed-loop NOx control 240 and the closed-loop noise control 250, the combustion noise level is maintained with transparency and the actual engine out NOx is increased by reducing the EGR and advancing the timing, therefore, combustion may be more efficient to further reduce fuel consumption in addition to the engine load down shifting. In the meantime, the aftertreatment system can reduce the vehicle tailpipe NOx to the desired level. The control routine 300 can be applied to a spark-ignition or compression-ignition engine.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a powertrain system, the powertrain system including an internal combustion engine and an electric machine that are disposed to generate torque that is transferred via a geartrain to a vehicle driveline, the method comprising:
   determining a desired output torque;
   determining an engine torque command and an electric machine torque command based upon the desired output torque;
   determining an engine-out NOx setpoint associated with operating the engine at the desired output torque;
   operating the electric machine in response to the electric machine torque command; and
   operating the engine to generate torque in response to the engine torque command and controlling engine operation in response to the engine-out NOx setpoint that is associated with operating the engine at the desired output torque.

2. The method of claim 1, wherein operating the engine to generate torque in response to the engine torque command comprises supplying an amount of fuel to the internal combustion engine to generate torque in response to the engine torque command.

3. The method of claim 1, wherein controlling engine operation in response to the engine-out NOx setpoint comprises controlling engine EGR flow to achieve the engine-out NOx setpoint.

4. The method of claim 3, wherein controlling engine operation in response to the engine-out NOx setpoint comprises:
   dynamically determining engine-out NOx emissions, and
   executing a first closed-loop control routine to control the EGR flow based upon the engine out NOx emissions and the engine-out NOx setpoint.

5. The method of claim 1, wherein controlling engine operation to achieve the engine-out NOx setpoint comprises controlling engine start of injection (SOI) timing to achieve the engine-out NOx setpoint.

6. The method of claim 5, wherein controlling engine operation to achieve the engine-out NOx setpoint comprises:
   dynamically determining engine-out NOx emissions, and
   executing a second closed-loop control routine to control the SOI timing based upon the engine out NOx emissions and the engine-out NOx setpoint.

7. The method of claim 1, further comprising:
   determining a combustion noise setpoint associated with operating the engine at the desired output torque; and
   operating the engine to generate torque in response to the engine torque command and controlling engine operation in response to the combustion noise setpoint.

8. The method of claim 7, wherein controlling engine operation in response to the combustion noise setpoint comprises controlling SOI timing to achieve the combustion noise setpoint.

9. The method of claim 8, wherein controlling engine operation in response to the combustion noise setpoint comprises:
   dynamically determining combustion noise, and
   executing a third closed-loop control routine to control the SOI timing based upon the combustion noise and the combustion noise setpoint.

10. The method of claim 7, wherein controlling engine operation in response to the combustion noise setpoint comprises:
    dynamically determining combustion noise, and
    executing a third closed-loop control routine to control the EGR flow based upon the combustion noise and the combustion noise setpoint.

11. The method of claim 1, wherein the internal combustion engine comprises a compression-ignition engine.

12. A method for controlling a powertrain system, the powertrain system including an internal combustion engine and an electric machine that are disposed to generate torque that is transferred via a geartrain to a vehicle driveline, the method comprising:
    determining a desired output torque;
    determining an engine torque command and an electric machine torque command based upon the desired output torque;
    determining a combustion noise setpoint associated with operating the engine at the desired output torque;
    operating the electric machine in response to the electric machine torque command; and
    operating the engine to generate torque in response to the engine torque command and controlling engine operation to achieve the combustion noise setpoint that is associated with operating the engine at the desired output torque.

13. The method of claim 12, wherein the engine comprises a compression-ignition engine, and wherein controlling engine operation to achieve the combustion noise setpoint comprises controlling an engine start of injection timing to achieve the combustion noise setpoint.

14. The method of claim 12, wherein the engine comprises a spark-ignition engine, and wherein controlling engine operation to achieve the combustion noise setpoint comprises controlling engine spark timing to achieve the combustion noise setpoint.

15. A powertrain system including an internal combustion engine and an electric machine that are disposed to generate torque that is transferable to a vehicle driveline via a geartrain, the powertrain system comprising:
    a first controller disposed to control the powertrain system, the first controller including an instruction set, the instruction set executable to:
    determine a desired output torque;
    determine an engine torque command and an electric machine torque command based upon the desired output torque; and
    operate the electric machine in response to the electric machine torque command; and
    a second controller disposed to control the internal combustion engine, the second controller including an instruction set, the instruction set executable to:
    determine an engine-out NOx setpoint associated with operating the engine at the desired output torque; and
    operate the engine to generate torque in response to the engine torque command and control engine operation to achieve the engine-out NOx setpoint that is associated with operating the engine at the desired output torque.

16. The powertrain system of claim 15, wherein the instruction set executable to control engine operation to achieve the engine-out NOx setpoint comprises the instruction set executable to control engine EGR flow to achieve the engine-out NOx setpoint.

17. The powertrain system of claim 15, wherein the instruction set executable to control engine operation to achieve the engine-out NOx setpoint comprises the instruction set executable to control engine start of injection (SOI) timing to achieve the engine-out NOx setpoint.

18. The powertrain system of claim 15, further comprising the instruction set executable to:
- determine a combustion noise setpoint associated with operating the engine at the desired output torque; and
- operate the engine to generate torque in response to the engine torque command and control engine operation in response to the combustion noise setpoint.

* * * * *